US 11,402,397 B2

(12) United States Patent
Kabe et al.

(10) Patent No.: US 11,402,397 B2
(45) Date of Patent: Aug. 2, 2022

(54) AUTOMATIC ANALYZER

(71) Applicant: Hitachi High-Technologies Corporation, Tokyo (JP)

(72) Inventors: Yoshihiro Kabe, Tokyo (JP); Takenori Okusa, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 364 days.

(21) Appl. No.: 16/646,683

(22) PCT Filed: Jan. 22, 2019

(86) PCT No.: PCT/JP2019/001775
§ 371 (c)(1),
(2) Date: Mar. 12, 2020

(87) PCT Pub. No.: WO2019/159609
PCT Pub. Date: Aug. 22, 2019

(65) Prior Publication Data
US 2020/0278364 A1 Sep. 3, 2020

(30) Foreign Application Priority Data
Feb. 13, 2018 (JP) .............................. JP2018-022845

(51) Int. Cl.
G01N 35/10 (2006.01)
G01N 35/04 (2006.01)
G01N 35/00 (2006.01)

(52) U.S. Cl.
CPC .......... G01N 35/1002 (2013.01); G01N 35/04 (2013.01); G01N 2035/00534 (2013.01); G01N 2035/0443 (2013.01)

(58) Field of Classification Search
CPC .......... B01L 3/527; G01N 2035/00534; G01N 2035/0443; G01N 35/0098; G01N 35/04; G01N 35/1002
See application file for complete search history.

(56) References Cited

U.S. PATENT DOCUMENTS 4,276,258 A 6/1981 Ginsberg et al.
4,970,053 A 11/1990 Fechtner
(Continued)

FOREIGN PATENT DOCUMENTS

JP 56-119854 A 9/1981
JP 57-185964 U 11/1982
(Continued)

OTHER PUBLICATIONS

International Search Report (PCT/ISA/210) issued in PCT Application No. PCT/JP2019/001775 dated Apr. 16, 2019 with English translation (five pages).
(Continued)

Primary Examiner — Jennifer Wecker
Assistant Examiner — Kathryn Elizabeth Limbaugh
(74) Attorney, Agent, or Firm — Crowell & Moring LLP

(57) ABSTRACT

In the case of adopting a configuration in which reagent bottles are radially disposed on a reagent disk and a reagent dispensing mechanism is rotated to access the reagent bottles, one reagent bottle includes a plurality of suction ports in which suction positions are different from each other, resulting in prolonging a step of dispensing a reagent. The invention is directed to an automatic analyzer including: a reagent disk that accommodates a plurality of reagent bottles including a plurality of suction ports and conveys the reagent bottles to a desired position by rotating in a circumferential direction around a central axis; and a reagent dispensing mechanism that rotates around a rotational axis
(Continued)

and sucks a reagent of the reagent bottle placed at a predetermined position on the reagent disk. The reagent bottle is accommodated in the reagent disk such that the central axis of the reagent bottle and a diameter of the reagent disk form a predetermined inclination.

6 Claims, 12 Drawing Sheets

(56) References Cited

U.S. PATENT DOCUMENTS

| | | | |
|---|---|---|---|
| 5,807,523 A | | 9/1998 | Watts et al. |
| 6,027,691 A | * | 2/2000 | Watts .................... G01N 35/025 422/67 |
| 2016/0154016 A1 | | 6/2016 | Yamashita et al. |
| 2017/0205436 A1 | | 7/2017 | Oonuma et al. |
| 2018/0246133 A1 | | 8/2018 | Imai et al. |

FOREIGN PATENT DOCUMENTS

| | | |
|---|---|---|
| JP | 63-29255 A | 2/1988 |
| JP | 5-60765 A | 3/1993 |
| JP | 2001-504577 A | 4/2001 |
| JP | 2010-107449 A | 5/2010 |
| JP | 2016-70788 A | 5/2016 |
| WO | WO 2015/019880 A1 | 2/2015 |
| WO | WO 2017/038235 A1 | 3/2017 |

OTHER PUBLICATIONS

Japanese-language Written Opinion (PCT/ISA/237) issued in PCT Application No. PCT/JP2019/001775 dated Apr. 16, 2019 (five pages).

* cited by examiner

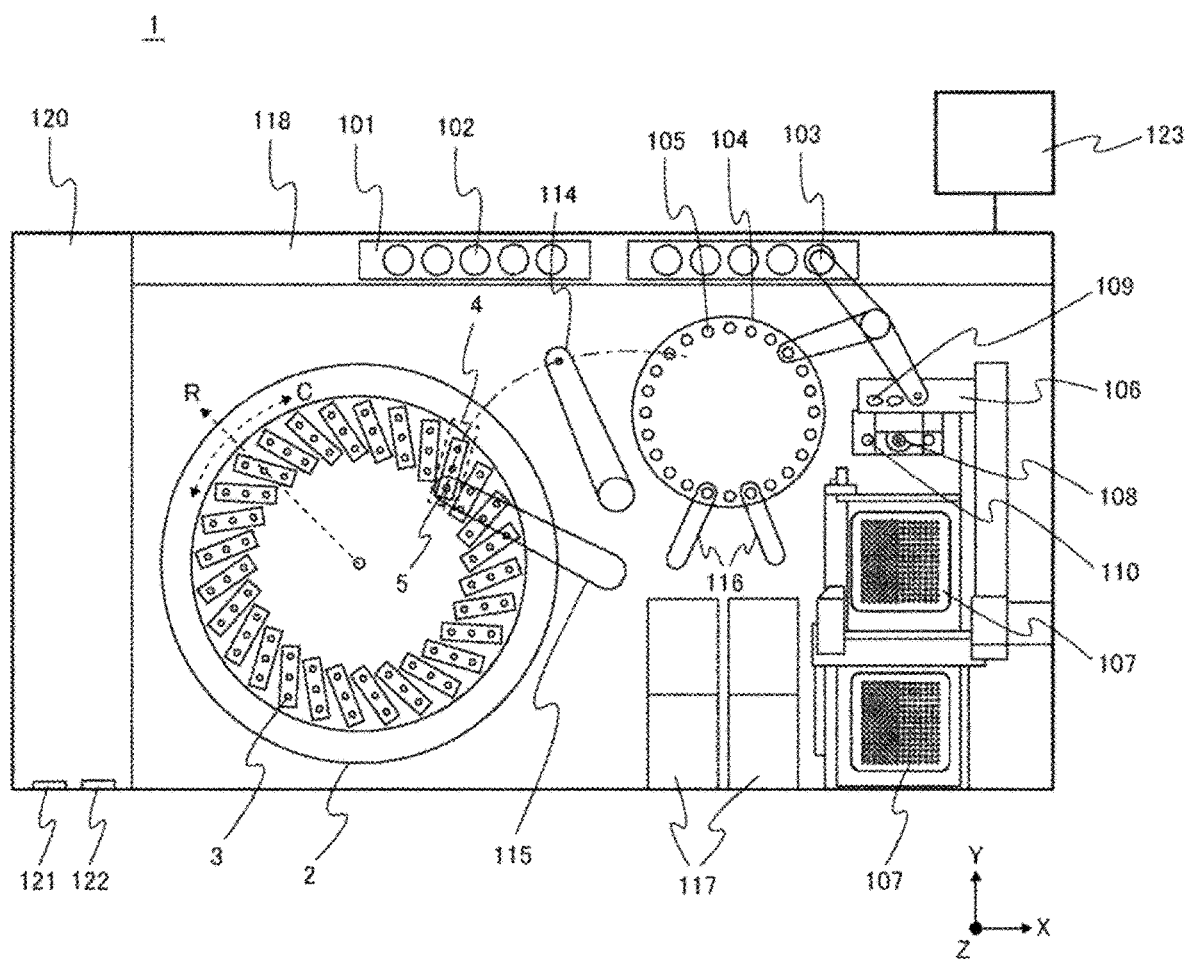
[FIG. 1A]

[FIG. 1B]
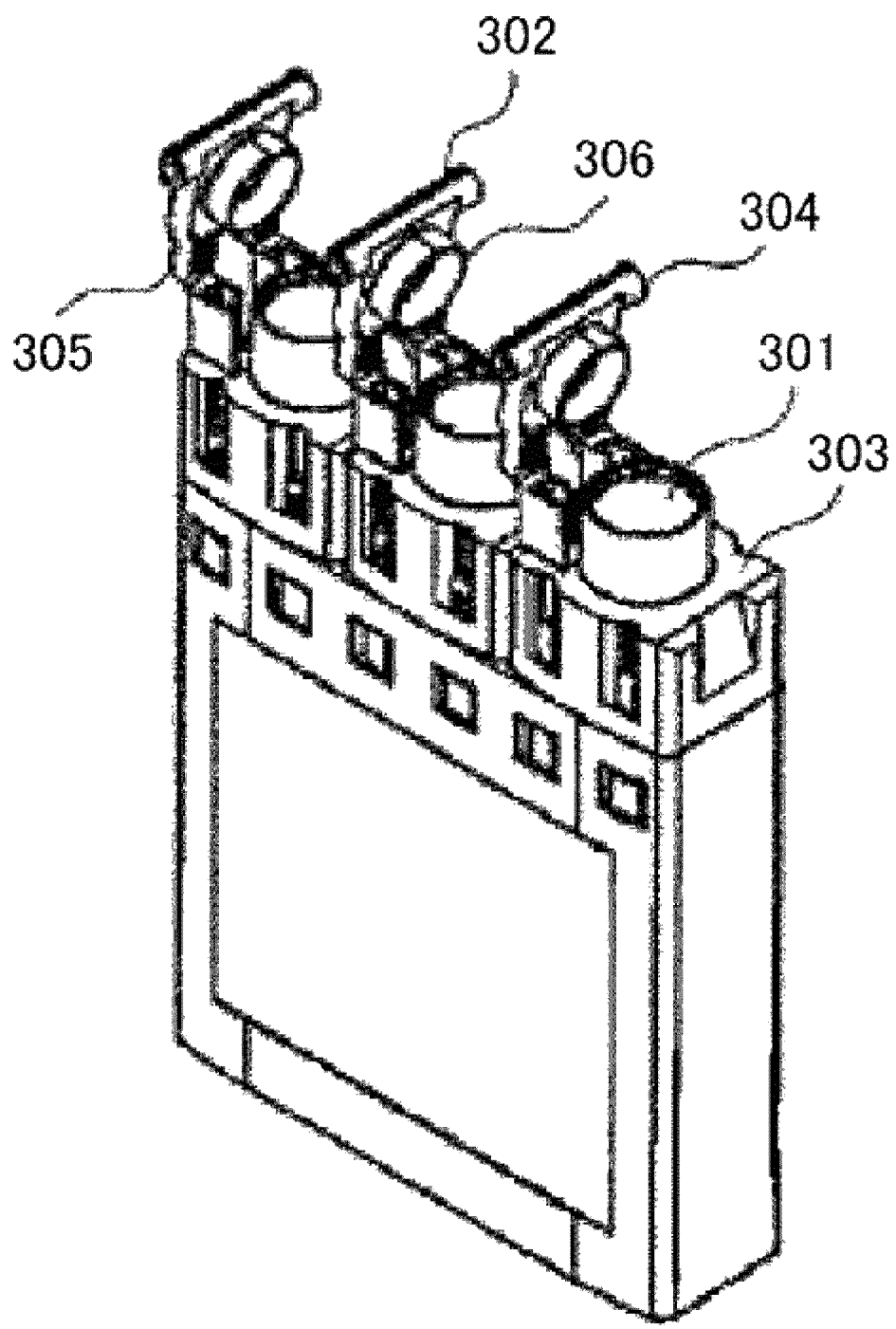

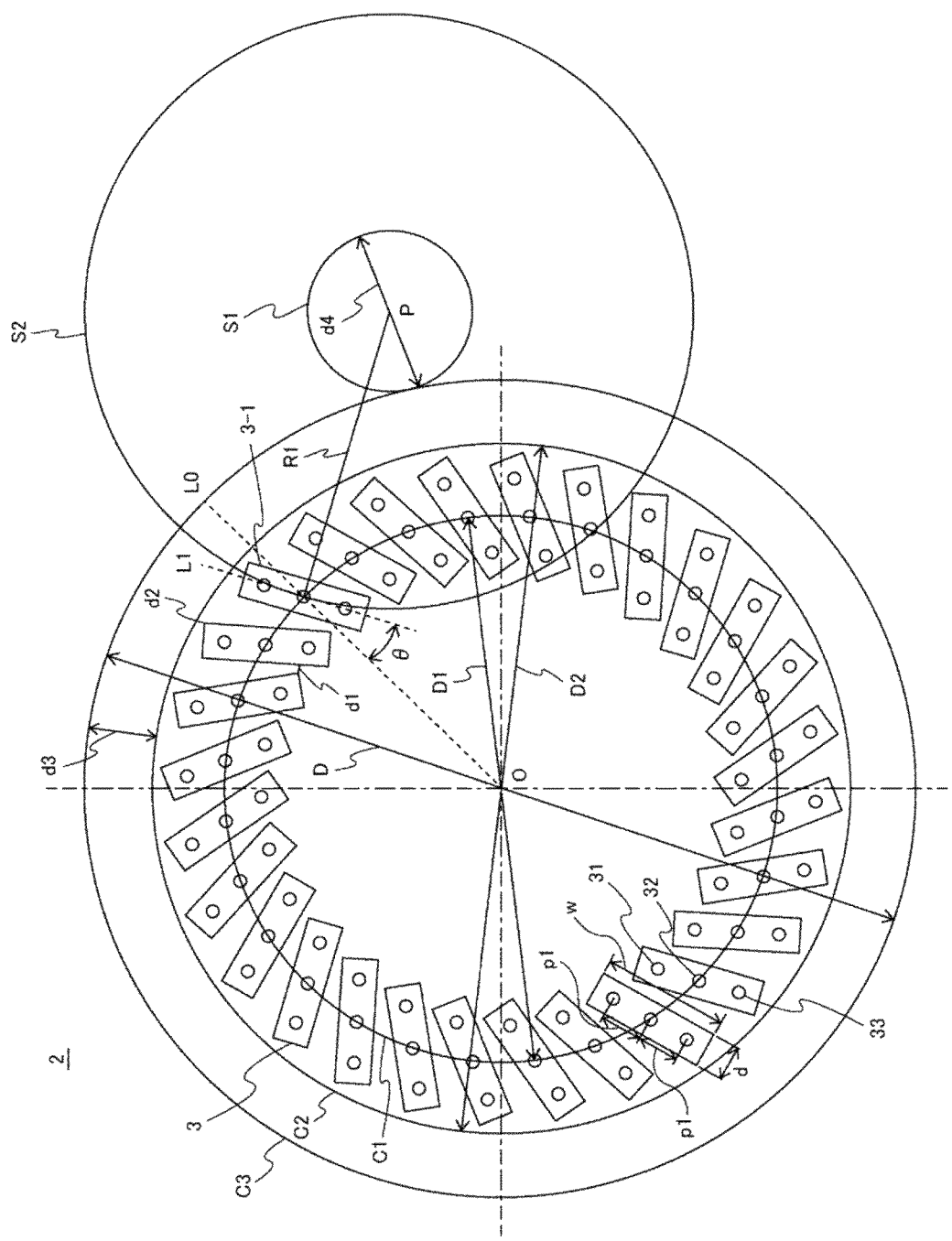
[FIG. 2]

[FIG. 3]
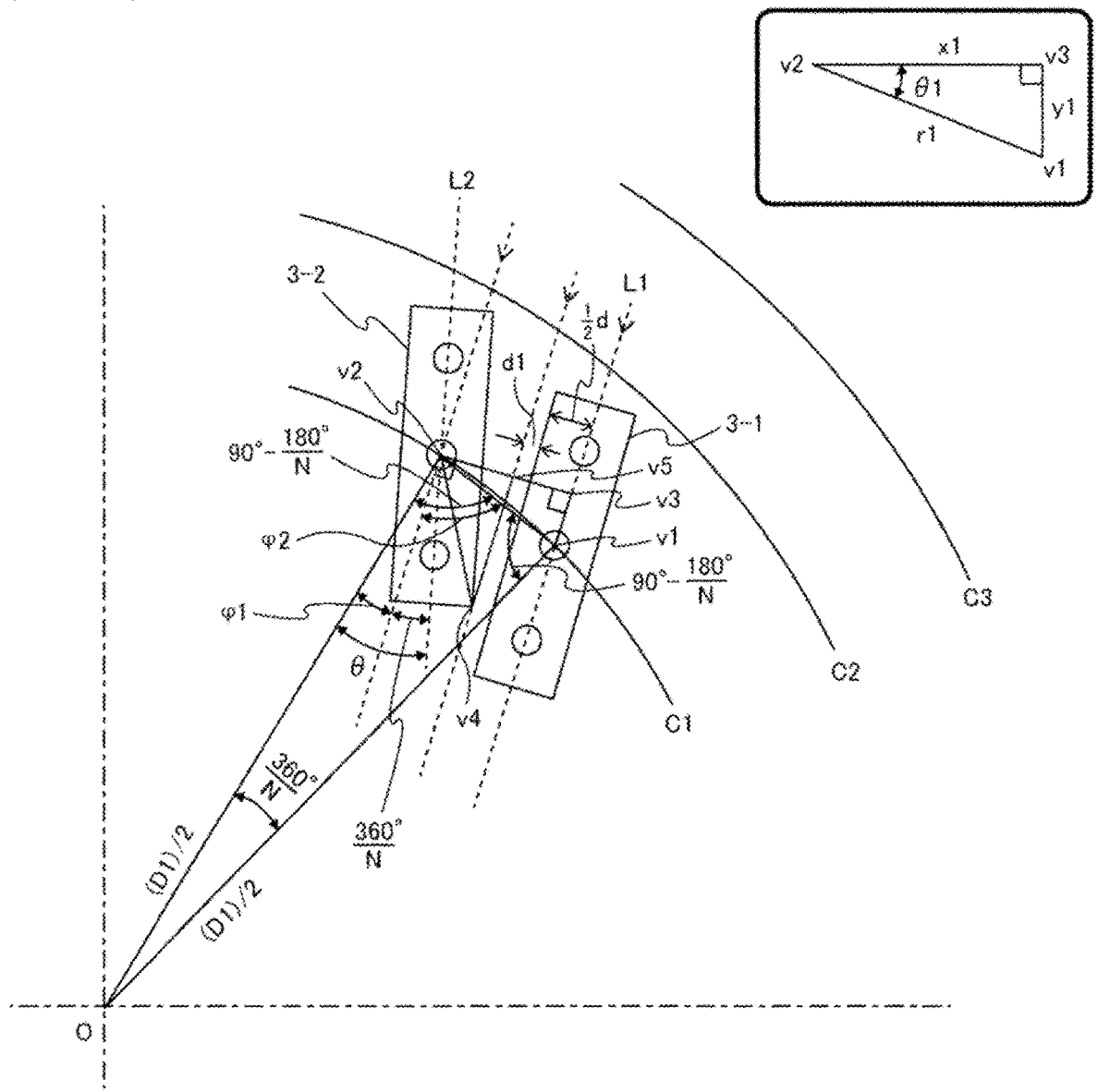

[FIG. 4]
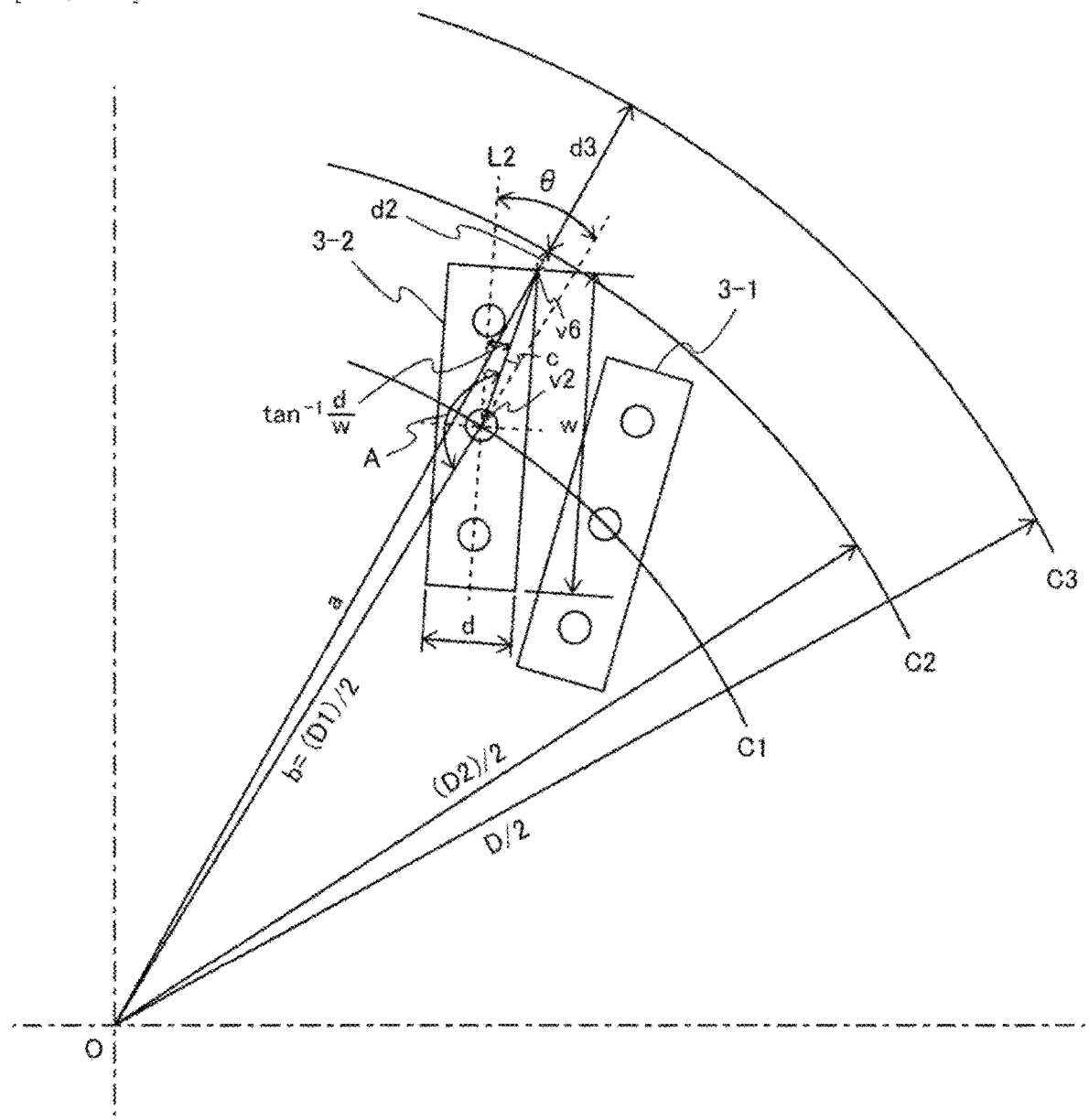

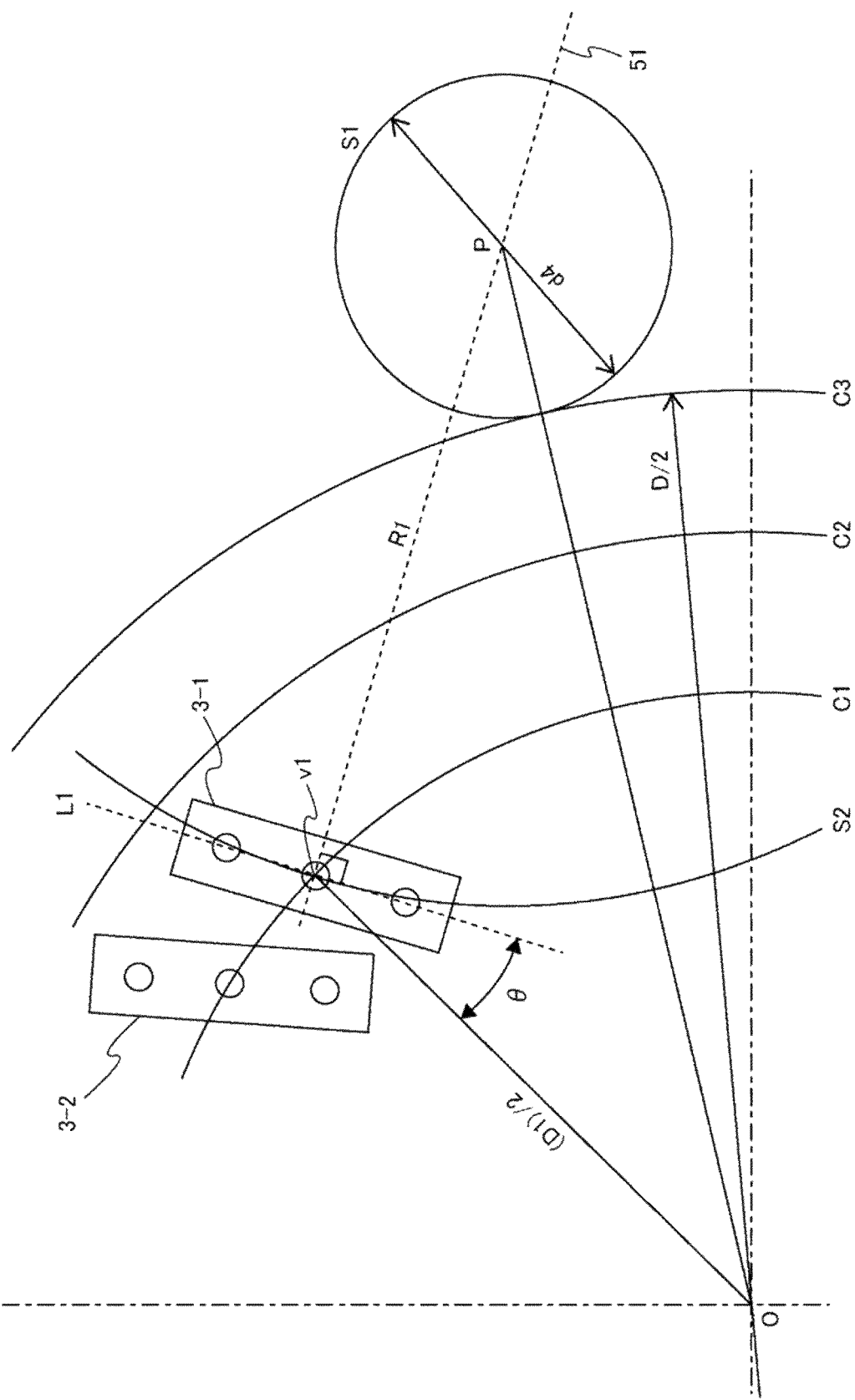
[FIG. 5]

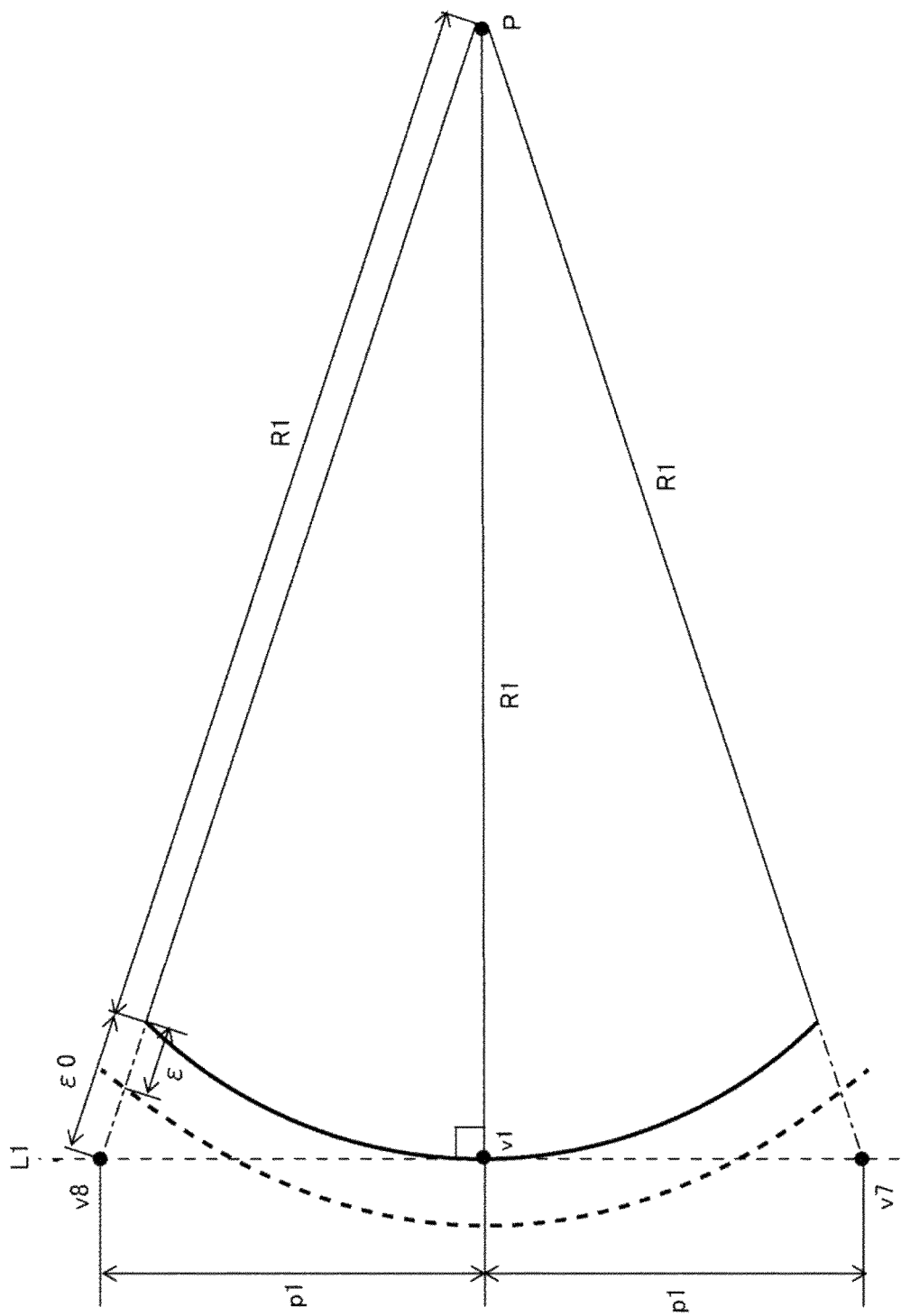
[FIG. 6]

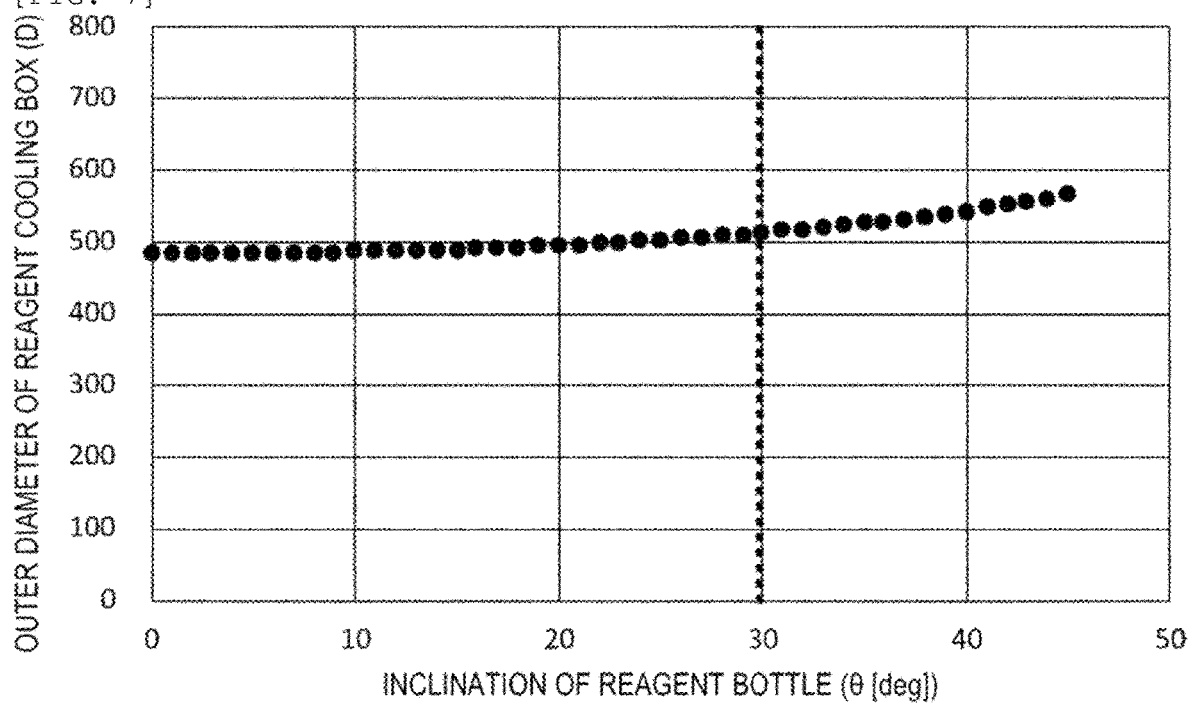
[FIG. 7]

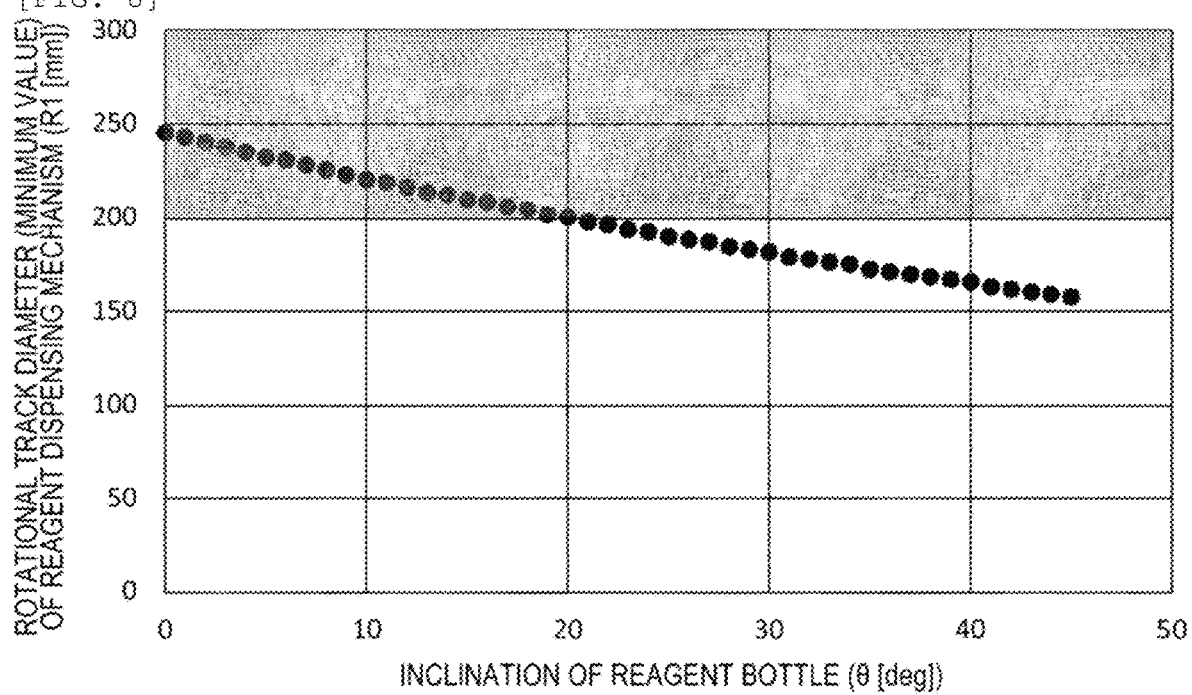

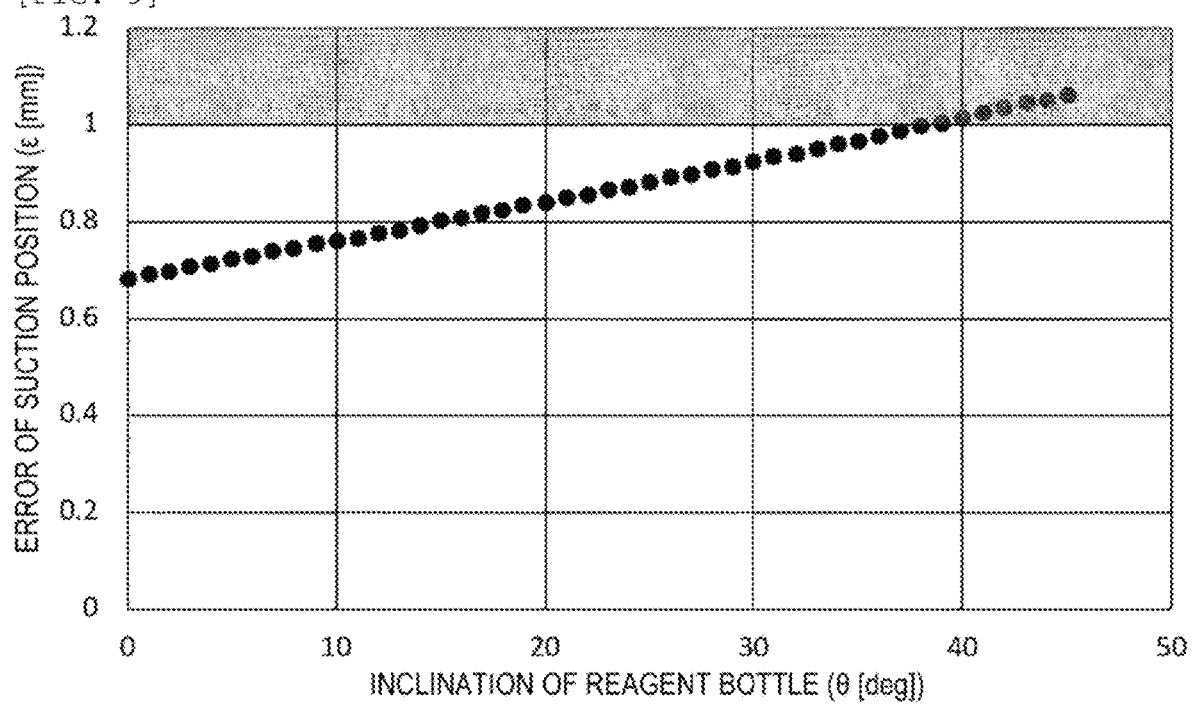

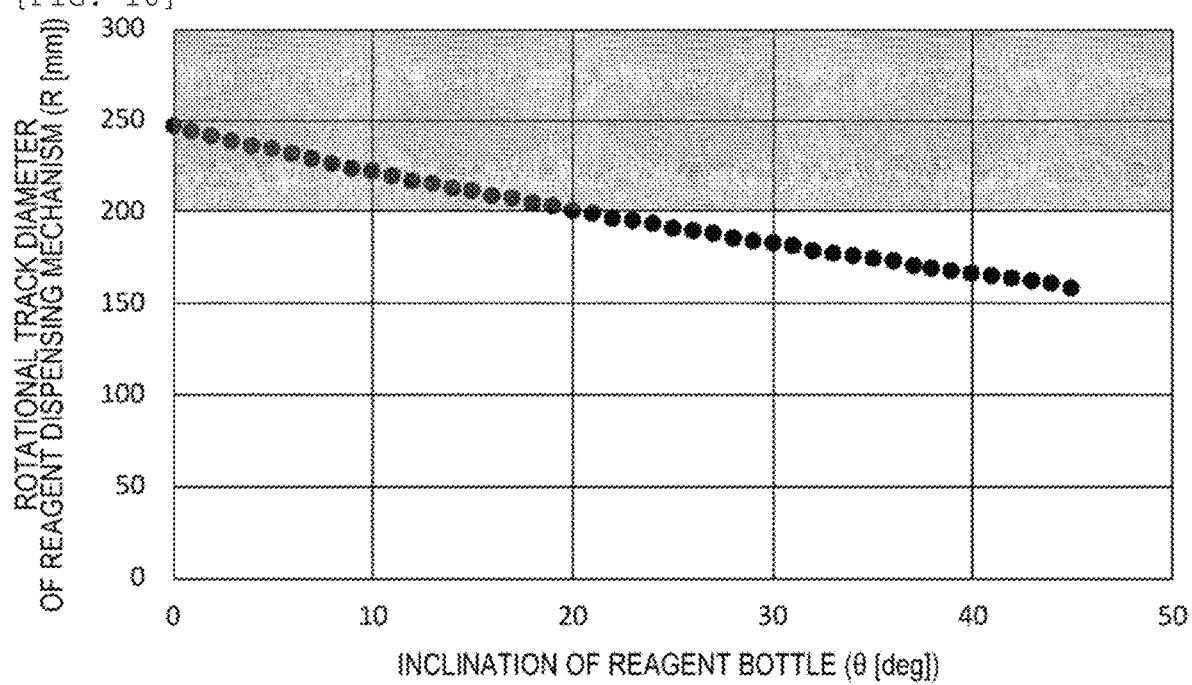

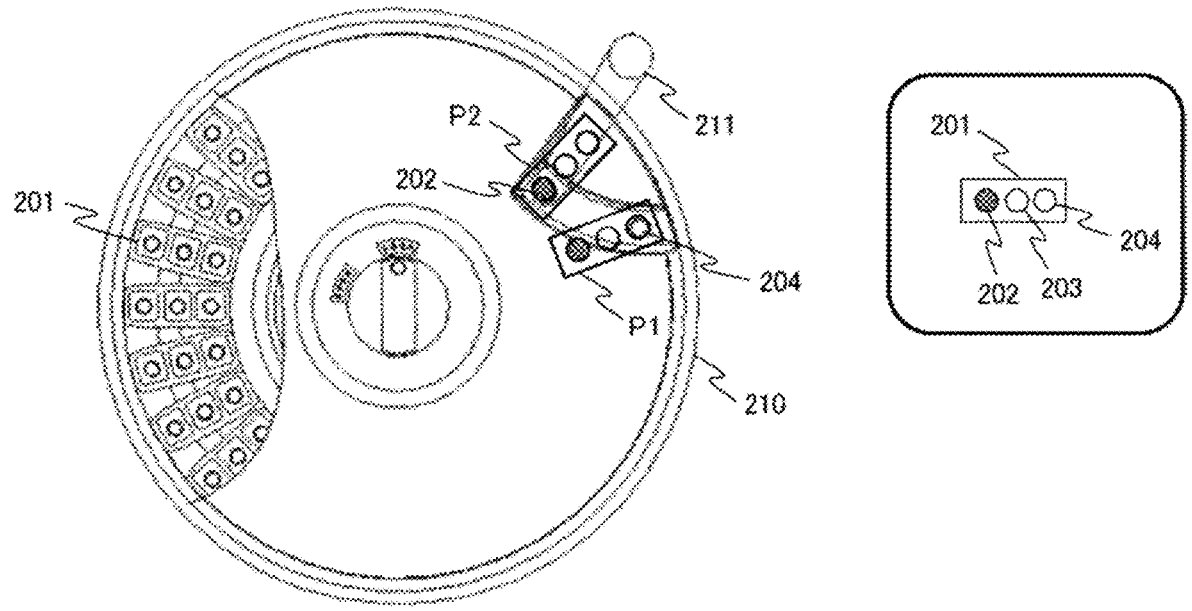
[FIG. 11]

AUTOMATIC ANALYZER

TECHNICAL FIELD

The present invention relates to an automatic analyzer used for biochemical analysis or immunoanalysis.

BACKGROUND ART

An automatic analyzer includes a step (hereinafter, referred to as a dispensing step) of suctioning a reagent from a reagent bottle, discharging the reagent into a reaction vessel and generating a reaction liquid in which a sample (also referred to as a specimen) and a reagent are mixed. For this reason, the automatic analyzer is provided with a reagent disk for installing a plurality of reagent bottles. The reagent disk includes a plurality of small compartments, each of which mounts a reagent bottle. The number of the small compartments is determined according to measurement items executed by the automatic analyzer and the number of reaction vessels that can be mounted. The measurement items increase with the development of medicine, and the types of analysis reagents increase accordingly. It is required that as many reagents as possible can be mounted on the automatic analyzer.

For example, as disclosed in Patent Literature 1, there has been known an automatic analyzer including a reagent disk in which a reagent container including a plurality of suction ports is radially arranged. A reagent is suctioned from the reagent container by accessing a dispensing mechanism capable of rotating in a horizontal plane and moving up and down in a vertical direction with respect to the plurality of suction ports provided in the reagent container.

Meanwhile, when a magnetic particle reagent for sample analysis is used, in the dispensing step, it is necessary to stir magnetic particle solution and sufficiently mix magnetic particles with the solution thereof immediately before suctioning the magnetic particle solution. In Patent Literature 2, similar to Patent Literature 1, a reagent container is radially provided on a reagent disk, and a magnetic particle stirring device and a reagent dispensing device are provided on a straight line passing over a plurality of openings of a predetermined reagent container. By moving the reagent container along the straight line on the reagent disk, the reagent is stirred and suctioned.

CITATION LIST

Patent Literature

Patent Literature 1: WO 2015/019880
Patent Literature 2: JP-A-2016-70788

SUMMARY OF INVENTION

Technical Problem

The problem of the invention will be described with reference to FIG. 11. In a case of a magnetic particle reagent, a magnetic particle solution, a reagent, and a sample are mixed and used. Therefore, one set of a reagent bottle of the magnetic particle reagent includes a container that accommodates a magnetic particle solution and a plurality of containers that accommodate a plurality of reagents respectively. In FIG. 11, among three suction ports of a reagent bottle 201, a suction port 202 is for the magnetic particle solution, and suction ports 203 and 204 are for the reagents.

Here, as in Patent Literature 1, when a configuration is used in which the reagent 201 is radially provided on a reagent disk 210 and a reagent dispensing mechanism 211 rotates to access the reagent bottle, as shown in FIG. 11, a suction position of the reagent dispensing mechanism 211 is different when the suction port is different. For example, in a case of the suction port 204, the suction position is a position P1, and in a case of the suction port 202, the suction position is a position P2 (in the drawing, the reagent bottles are shown at the positions P1 and P2. However, since the reagent disk is actually covered by a cover, the reagent bottles cannot be seen). For this reason, in the dispensing step, operation of suctioning the reagent (from the suction port 204), stirring the magnetic particle solution (from the suction port 202), and suctioning the magnetic particle solution (from the suction port 202) to the reagent bottle 201 always involves operation of rotating the reagent disk 210 from the position P1 to the position P2. Depending on the arrangement of each mechanism of the automatic analyzer, when the magnetic particle solution is stirred at a position different from the position P1, or the lid provided at each suction port of the reagent bottle 201 is opened at a position different from the position P1, time required for the reagent dispensing step is further prolonged since it is necessary to rotate the reagent disk to the position respectively and perform the respective operation.

Meanwhile, in Patent Literature 2, rotation of the reagent disk is unnecessary in the dispensing step of the magnetic particle reagent. However, the reagent container needs to be moved between the magnetic particle stirring device and the reagent dispensing device, and time therefor is also required. Since the reagent disk and the mechanism are large, it is desirable to apply a rotating reagent dispensing mechanism so as to reduce the number of components and downsize.

Solution to Problem

An automatic analyzer according to an embodiment of the invention including: a reagent disk that accommodates a plurality of reagent bottles including a plurality of suction ports and conveys the reagent bottles to a desired position by rotating in a circumferential direction around a central axis; and a reagent dispensing mechanism that rotates around a rotational axis and suctions a reagent of the reagent bottle placed at a predetermined position on the reagent disk, in which the reagent bottle is accommodated in the reagent disk such that the central axis of the reagent bottle and a diameter of the reagent disk form a predetermined inclination $\theta$ ($\theta>0$).

Other problems and novel characteristics will become apparent from a description of the present description and the accompanying drawings.

Advantageous Effect

A reagent dispensing mechanism and a stirring device are simultaneously accessible to the same reagent bottle including a plurality of suction ports, and the number of dispensing steps per unit time and analysis processing ability can be improved.

BRIEF DESCRIPTION OF DRAWINGS

FIG. 1A is a diagram illustrating an entire configuration of an automatic analyzer.

FIG. 1B is a schematic perspective view of a reagent bottle.

FIG. 2 is a diagram illustrating an arrangement of a reagent dispensing mechanism on a reagent disk.

FIG. 3 is a diagram illustrating a method of calculating a diameter D1 of a circumference passing through a center of the reagent bottle.

FIG. 4 is a diagram illustrating a method of calculating an inner diameter D2 and an outer diameter D of a reagent cooling box.

FIG. 5 is a diagram illustrating a method of calculating a rotational track diameter (minimum value) R1 of the reagent dispensing mechanism.

FIG. 6 is a diagram illustrating a method of calculating a rotational track diameter R of the reagent dispensing mechanism in which an error of suction position ε is optimized.

FIG. 7 is a graph of an inclination θ of the reagent bottle and an outer diameter D of the reagent cooling box.

FIG. 8 is a graph of the inclination θ of the reagent bottle and the rotational track diameter (minimum value) R1 of the reagent dispensing mechanism.

FIG. 9 is a graph of the inclination θ of the reagent bottle and an error of suction position ε.

FIG. 10 is a graph of the inclination θ of the reagent bottle and the rotational track diameter R of the reagent dispensing mechanism.

FIG. 11 is a diagram illustrating the problem of the present invention.

DESCRIPTION OF EMBODIMENTS

FIG. 1A shows an overall configuration of an automatic analyzer 1 that is a plane configuration in which the automatic analyzer 1 installed on an XY plane, which is a horizontal plane, is seen from above (a Z direction). An X direction and a Y direction are orthogonal to each other forming a horizontal plane. Here, the X direction corresponds to a lateral width direction of the automatic analyzer 1, and the Y direction corresponds to a vertical width direction of the automatic analyzer 1. A Z direction is a vertical direction perpendicular to the X direction and the Y direction, and corresponds to a height direction of the automatic analyzer 1. In addition, a radial direction R of a reagent disk 2 and a circumferential direction C of the reagent disk 2 are shown in the horizontal plane.

The automatic analyzer 1 includes a control computer 123, a rack conveying unit 120, a rack conveying line 118, a sample dispensing mechanism 103, an incubator disk 104, a conveyance mechanism 106, a holding member 107, a reaction vessel stirring mechanism 108, a disposal hole 109, the reagent disk 2, a reagent dispensing mechanism 114, a magnetic particle stirring device 115, a reaction vessel conveying mechanism 116, and a detection unit 117.

The control computer 123 controls each mechanism based on analysis request information of the automatic analyzer 1 to implement steps for analysis. The steps include a dispensing step and the like. The control computer 123 also provides an interface to a user.

A sample to be analyzed by the automatic analyzer 1 is accommodated in a sample container 102, and the sample container 102 is carried into the automatic analyzer 1 in a state of being installed in a rack 101. The rack conveying unit 120 is a mechanism that carries the rack 101 into the automatic analyzer 1 or carries out the rack 101 to the outside. The rack conveying unit 120 includes a power-on instructing unit 121 and a power-off instructing unit 122 of the automatic analyzer 1. The power-on instructing unit 121 and the power-off instructing unit 122 are buttons that are input by an operator (a user who operates the automatic analyzer 1). A display unit of the control computer 123 may include an input unit corresponding to the power-on instructing unit 121 and the power-off instructing unit 122.

The rack 101 carried into by the rack conveying unit 120 is moved by the rack conveying line 118 to a sample dispensing position in a vicinity of the sample dispensing mechanism 103. It is possible to install a plurality of reaction vessels 105 in a circumferential portion of the incubator disk 104, and to perform a rotational movement of moving the reaction vessels 105 installed in the circumferential direction to a predetermined position.

The conveyance mechanism 106 is movable in directions of three axes X, Y, and Z. The conveyance mechanism 106 is a mechanism that conveys a sample dispensing chip and the reaction vessel 105, and moves within a range of predetermined locations of the holding member 107 that holds the sample dispensing chip and the reaction vessel 105, the reaction vessel stirring mechanism 108 that stirs the reaction vessel 105, the disposal hole 109 that discards the sample dispensing chip or the reaction vessel 105, a sample dispensing chip mounting position 110, and the incubator disk 104.

The holding member 107 holds a plurality of unused reaction vessels and unused sample dispensing chips. First, the conveyance mechanism 106 moves above the holding member 107, moves down, grasps an unused reaction vessel 105 and then rises, and moves further above a predetermined position of the incubator disk 104 and then moves down, so that the reaction vessel 105 is installed at the predetermined position on the incubator disk 104.

Next, the conveyance mechanism 106 moves again above the holding member 107, moves down and rises after grasping an unused sample dispensing chip, and moves above the sample dispensing chip mounting position 110 and then moves down, so that the sample dispensing chip is installed at the sample dispensing chip mounting position 110. The sample dispensing chip is mounted on a tip of a nozzle (a probe) when the sample dispensing mechanism 103 dispenses a sample so as to prevent contamination, and is discarded when dispensing of the sample is completed.

The sample dispensing mechanism 103 is capable of rotating on the horizontal plane and moving up and down in the vertical direction (the Z direction). The sample dispensing mechanism 103 moves up to above the sample dispensing chip mounting position 110 by rotating, and then moves down to press-fit and mount the sample dispensing chip into the tip of the nozzle. The sample dispensing mechanism 103 having the sample dispensing chip mounted on the tip of the nozzle moves above the sample container 102 placed on the conveying rack 101, and then moves down to suction the sample held in the sample container 102 by a predetermined amount. After moving above the incubator disk 104, the sample dispensing mechanism 103 which has suctioned the sample moves down and discharges the sample to the unused reaction vessel 105 held in the incubator disk 104. When the sample discharge is completed, the sample dispensing mechanism 103 moves above the disposal hole 109, and discards the used sample dispensing chip from the disposal hole 109.

The reagent disk 2 has a disk shape and rotates. The reagent disk 2 is provided with a plurality of reagent bottles 3. The reagent disk 2 rotates around a central axis in the vertical direction in the horizontal plane. Accordingly, the reagent bottle 3 provided on the reagent disk 2 moves in the circumferential direction C and is conveyed to a predetermined position corresponding to the step.

The reagent disk 2 may be provided with, for example, the reagent bottle 3 including three container portions as one set. FIG. 1B is a schematic perspective view of the reagent bottle 3. In a case of a magnetic particle reagent, one set includes one container portion that accommodates a magnetic particle solution and two container portions that accommodates a reagent. The number of the container portions in the reagent bottle 3 is not limited to three as long as the number of the container portions is plural. Each container portion includes a main body portion that accommodates the reagent, a suction port 301 that is accessible to the reagent, and a lid 302 capable of sealing the suction port 301. An entire outer shape of the reagent bottle 3 is a substantially rectangular parallelepiped shape including a shoulder portion 303, and three suction ports 301 are arranged above the shoulder portion and project upward. In order to open and close a reagent container lid opening and closing mechanism (not illustrated) of the automatic analyzer, a projection portion 304 is provided at one end of the lid 302 and projects in a side direction of the reagent bottle 3. The lid 302 is rotatable with a hinge 305 being a rotation axis, and the lid 302 is provided with a sealing member 306. By inserting the sealing member 306 into the suction port 301 and closing the lid 302, evaporation of the reagent and change in concentration are prevented. As illustrated in FIG. 1A, the automatic analyzer 1 according to the present embodiment is arranged such that the reagent bottle 3 has a predetermined angle θ (θ>0) with respect to the radial direction R of the reagent disk 2 (herein, referred to as "oblique arrangement"). This will be described below in detail.

A cover (not illustrated) is provided on an upper part of the reagent disk 2, so that intrusion of dust or the like is prevented, and a space portion including the reagent disk 2 is kept warm or cold at a predetermined temperature. That is, the space portion including the reagent disk 2 also functions as a warming box or a cooling box. In the present embodiment, since the reagent dispensing mechanism 114 or the magnetic particle stirring device 115 accesses the reagent bottle 3 in a region 4, it is desirable to provide an opening in the cover and to provide the reagent container lid opening and closing mechanism. This makes it unnecessary to rotate the reagent disk between the opening and closing operation of the lid of the reagent container and reagent suction operation, thereby shortening time required for the dispensing step.

The reagent dispensing mechanism 114 is capable of rotating in the horizontal plane and moving up and down in the vertical direction. The reagent dispensing mechanism 114 moves above the region 4 (the opening of the cover) by rotating, and then moves down and immerses the tip of the nozzle (the probe) in the reagent in the reagent bottle 3 whose lid is opened by the reagent container lid opening and closing mechanism to suction a predetermined amount of the reagent. Next, the reagent dispensing mechanism 114 rises, and then moves above the predetermined position of the incubator disk 104 by rotating and discharges the reagent into the reaction vessel 105. As illustrated in the drawing, a rotational track of the reagent dispensing mechanism 114 is set to pass over a plurality of suction ports of one reagent bottle at a predetermined position.

The magnetic particle stirring device 115 is also capable of rotating in the horizontal plane and moving up and down in the vertical direction. A position of the suction port of a container that accommodates the magnetic particle solution is a position 5. Therefore, the magnetic particle stirring device 115 moves above the position 5 by rotating and then moves down, and immerses the tip of the magnetic particle stirring device 115 in the magnetic particle solution in the reagent bottle 3 and stirs the magnetic particle solution.

With such a configuration, when the magnetic particle reagent is used as the reagent, the reagent dispensing mechanism 114 can dispense the reagent while the magnetic particle solution is stirred by the magnetic particle stirring device 115. Accordingly, it is possible to shorten the time required for the dispensing step of the magnetic particle reagent.

The reaction vessel 105 to which the sample, the reagent, and the magnetic particle solution are discharged moves to the predetermined position by the rotation of the incubator disk 104, and is conveyed to the reaction vessel stirring mechanism 108 by the conveyance mechanism 106. The reaction vessel stirring mechanism 108 stirs and mixes the sample and the reagent in the reaction vessel 105 by rotating the reaction vessel 105. Accordingly, a reaction liquid is generated in the reaction vessel 105.

After completion of the stirring, the reaction vessel 105 is returned to the predetermined position of the incubator disk 104 by the conveyance mechanism 106. The reaction vessel conveying mechanism 116 transfers the reaction vessel 105 between the incubator disk 104 and the detection unit 117. The reaction vessel conveying mechanism 116 grasps the reaction vessel 105 and rises, and conveys the reaction vessel 105 to the detection unit 117 by rotating. The reaction vessel 105 is analyzed in the detection unit 117. The reaction vessel 105 whose analysis is completed is returned to the incubator disk 104 by the reaction vessel conveying mechanism 116. Thereafter, the reaction vessel 105 is moved from the incubator disk 104 to above the disposal hole 109 by the conveyance mechanism 106, and is discarded from the disposal hole.

With reference to FIG. 2, an optimum arrangement of the reagent dispensing mechanism 114 with respect to the reagent disk 2 when the reagent bottle 3 is obliquely arranged in the reagent disk 2 will be described. The reagent disk 2 has a disk shape, and the plurality of reagent bottles 3 are accommodated in a circumferential portion thereof. The rotation axis of the reagent disk 2 is denoted by O. The reagent bottle 3 includes three suction ports 31, 32, 33 (when the suction ports are distinguished from one another, the suction ports are referred to as a first suction port 31, a second suction port 32, and a third suction port 33 in order from the inside while being accommodated in the reagent disk 2). The reagent dispensing mechanism 114 is capable of rotating in the horizontal plane passing through a track (a track of the nozzle when the reagent dispensing mechanism 114 is rotated is denoted by S2) along the three suction ports of a reagent bottle 3-1 and moving up and down in the vertical direction. The rotation axis of the reagent dispensing mechanism 114 is denoted by P.

In the reagent disk 2, N reagent bottles 3 are mounted. A length of the reagent bottle 3 in a width direction is d, a length in a depth direction is w, and a distance among the three suction ports is p1. All of the reagent bottles 3 have the same shape. In the present embodiment, the reagent bottle 3 is arranged with a predetermined inclination θ (θ>0) with respect to a diameter of the reagent disk 2 (θ is defined as an angle formed between a diameter L0 of the reagent disk 2 passing through a center of the second suction port 32 of the reagent bottle 3-1 and a central axis (in the depth direction) L1 of the reagent bottle 3 passing through the center of the second suction port 32 of the reagent bottle 3-1).

With respect to the reagent disk 2, a circumference C1 passing through the center of the second suction port 32 of the reagent bottle 3, an inner periphery C2 of a reagent cooling box, and an outer periphery (=an outer periphery of the reagent disk 2) C3 of the reagent cooling box are illustrated. A diameter of the circumference C1 is D1, an inner diameter of the reagent cooling box is D2, and an outer diameter (=an outer diameter of the reagent disk 2) of the reagent cooling box is D. A shortest distance between adjacent reagent bottles 3 is d1, a clearance between the reagent bottle 3 and the inner periphery of the reagent cooling box is d2, and a thickness of the reagent cooling box is d3.

A diameter of a drive mechanism of the reagent dispensing mechanism 114 is d4 and a diameter of the rotational track S2 (as described above, the track of the nozzle is referred to as the "rotational track of the reagent dispensing mechanism", and a size thereof corresponds to a distance between the central axis of the reagent dispensing mechanism and the nozzle) of the reagent dispensing mechanism 114 is R1. As described below, R1 is a length when the diameter of the rotational track S2 is the minimum, and the rotational track S2 is the diameter of the rotational track passing through the center of the second suction port 32 of the reagent bottle 3-1.

A mounting number N of the reagent bottle to the reagent disk 2, a shape of the reagent bottle, and the distances d1 to d4 are fixed values. For example, d1 and d2 are defined to be satisfied with strength required to support the reagent bottle. Therefore, the outer diameter D of the reagent disk 2 and the diameter of the rotational track of the reagent dispensing mechanism 114 are calculated and optimized using the inclination θ of the reagent bottle 3 as a variable. If the outer diameter of the reagent disk 2 is large, the size of the automatic analyzer increases, and if the diameter of the rotational track of the reagent dispensing mechanism 114 is large, dispensing operation may be inaccurate due to vibration or the like accompanying the rotating operation. Therefore, it is desirable to make both of the outer diameter of the reagent disk 2 and the diameter of the rotational track of the reagent dispensing mechanism 114 as small as possible.

First, the diameter D1 of the circumference C1 is obtained. A method of obtaining the diameter D1 will be described with reference to FIG. 3. Centers (centers of the second suction ports) of the two reagent bottles 3-1 and 3-2 are v1 and v2, respectively. Here, a first auxiliary line that extends along the central axis (in the depth direction) L1 of the reagent bottle 3-1 through v1, and a second auxiliary line that crosses the first auxiliary line at a right angle through v2 are drawn, and an intersection between the first auxiliary line and the second auxiliary line is v3. Here, a distance between v1-v2 is r1, a distance between v2-v3 is x1, a distance between v1-v3 is y1, an angle formed between the straight line (v1-v2) and the straight line (v2-v3) is θ1 (see an enlarged view shown in the upper right of FIG. 3). In this case, Formula 1 is derived by applying a three-square theorem to a triangle (v1, v2, v3).

$$x1^2 + y1^2 = r1^2 \quad \text{(Formula 1)}$$

Since a triangle (v1, v2, O) is an isosceles triangle with a distance between v1-O=a distance between v2-O=(D1)/2, Formula 2 is derived.

$$r1 = D1 \cdot \sin\left(\frac{180}{N}\right) \quad \text{(Formula 2)}$$

x1 and y1 can be calculated by Formula 4 and Formula 5, as will be described below. As illustrated in FIG. 3, a third auxiliary line parallel to the central axis L1 of the reagent bottle 3-1 through one vertex v4 of the reagent bottle 3-2 is drawn, and an intersection of the third auxiliary line and the second auxiliary line is v5. When attention is paid to a right triangle (v2, v4, v5) and a distance between v2-v5 is t, Formula 3 is derived.

$$t = \frac{\sqrt{w^2 + d^2}}{2} \cdot \sin\left(\frac{360}{N} + \tan^{-1}\frac{d}{w}\right) \quad \text{(Formula 3)}$$

Therefore, x1 can be expressed by Formula 4.

$$x1 = \frac{d}{2} + d1 + t = \frac{d}{2} + d1 + \frac{\sqrt{w^2 + d^2}}{2} \cdot \sin\left(\frac{360}{N} + \tan^{-1}\frac{d}{w}\right) \quad \text{(Formula 4)}$$

On the other hand, when attention is paid to the right triangle (v1, v2, v3), y1 can be expressed by Formula 5.

$$y1 = \tan(\theta 1) \cdot x1 \quad \text{(Formula 5)}$$

Here, as illustrated in FIG. 3, since θ1=90−φ2, θ1 can be expressed by Formula 6.

$$\theta 1 = 90 - \varphi 2 = 90 - \left(\left(90 - \frac{180}{N}\right) - \varphi 1\right) = \quad \text{(Formula 6)}$$
$$90 - \left(90 - \frac{180}{N} - \left(\theta - \frac{360}{N}\right)\right) = \theta - \frac{180}{N}$$

Since Formula 4 is a formula that only includes fixed values and does not include variables, x1 is a fixed value. Since there is a relationship of r1=x1cos(θ1), D1 can be expressed by Formula 7 from Formula 2 and Formula 6.

$$D1 = \frac{x1}{\sin\left(\frac{180}{N}\right) \cdot \cos\left(\theta - \frac{180}{N}\right)} \quad \text{(Formula 7)}$$

Next, the inner diameter D2 of the reagent cooling box and the outer diameter (=the outer diameter of the reagent disk 2) D of the reagent cooling box are obtained with reference to FIG. 4. First, a vertex of the reagent bottle 3-2 located farthest from the rotational axis O of the reagent disk 2 is v6, and the cosine theorem is applied to a triangle (v2, O, v6). When a length of each side of the triangle (v2, O, v6) is a, b, and c as shown in FIG. 4, a dimension a, a dimension b, a dimension c, and an angle A can be calculated by Formula 8 to Formula 11, respectively.

$$a = \sqrt{b^2 + c^2 - 2bc \cdot \cos A} \quad \text{(Formula 8)}$$

$$b = \frac{D1}{2} = \frac{1}{2} \cdot \frac{x1}{\sin\left(\frac{180}{N}\right) \cdot \cos\left(\theta - \frac{180}{N}\right)} \quad \text{(Formula 9)}$$

$$c = \frac{\sqrt{(w^2 + d^2)}}{2} \quad \text{(Formula 10)}$$

$$A = 180 - \left[\theta - \tan^{-1}\left(\frac{d}{w}\right)\right] \quad \text{(Formula 11)}$$

Here, since the inner diameter D2 of the reagent cooling box and the outer diameter D (=the outer diameter of the reagent disk 2) of the reagent cooling box have a relationship of Formula 12 and Formula 13 respectively, by applying Formula 8 to Formula 11 to thereto, lengths of the inner diameter D2 and the outer diameter D can be calculated.

$$D2 = 2(a+d2) \quad \text{(Formula 12)}$$

$$D = 2(a+d2+d3) \quad \text{(Formula 13)}$$

Next, the diameter (a minimum value) R1 of the rotational track of the reagent dispensing mechanism 114 is obtained with reference to FIG. 5. Since the reagent dispensing mechanism 114 rotates on the horizontal plane along the rotational track S2, a rotation central axis P thereof is on a line 51 orthogonal to the central axis (in the depth direction) L1 of the reagent bottle 3-1 from the center (the center of the second suction port) v1 of the reagent bottle 3-1 to be dispensed. Here, when the cosine theorem is applied to a triangle (v1, O, P), Formula 14 is established.

$$\frac{1}{2}(D+d4) = \sqrt{R1^2 + \left(\frac{D1^2}{2}\right) - 2 \cdot R1 \cdot \frac{D1}{2} \cdot \cos(90+\theta)} \quad \text{(Formula 14)}$$

Formula 14 can be rewritten as Formula 15 by being transformed.

$$R1^2 - D1\cos(90+\theta) \cdot R1 + \left[\left(\frac{D1}{2}\right)^2 - \left(\frac{D+d4}{2}\right)^2\right] = 0 \quad \text{(Formula 15)}$$

By using a formula of the solution of the quadratic equation for Formula 15, R1 can be calculated by Formula 16.

$$R1 = \frac{-b1 \pm \sqrt{b1^2 - 4c1}}{2} \quad \text{(Formula 16)}$$

Here, b1 and c1 are calculated by Formula 17 and Formula 18, respectively. R1 is a smallest one of the values obtained by the formula of the solution of the quadratic equation.

$$b1 = -D1 \cdot \cos(90+\theta) \quad \text{(Formula 17)}$$

$$c1 = \left(\frac{D1}{2}\right)^2 - \left(\frac{D+d4}{2}\right)^2 \quad \text{(Formula 18)}$$

Here, when R1 is used as a rotational track diameter of the reagent dispensing mechanism 114, a suction position error ε0 occurs between the second suction port 32 and the suction ports 31 and 33 excluding the suction port 32. FIG. 6 shows a positional relationship between a suction port of the reagent bottle 3-1 and the rotational track of the reagent dispensing mechanism 114 (however, in the drawing, the suction position error is emphasized for clarity). A center of the first suction port 31 of the reagent bottle 3-1 is v7, a center of the second suction port 32 is v1, and a center of the third suction port 33 is v8. Therefore, v1, v7, and v8 are located on the central axis L1 (in the depth direction) of the reagent bottle 3-1, and a distance between v1-v7 and a distance between v1-v8 are p1. By applying the Pythagorean theorem to a triangle (v1, P, v8), a relationship of Formula 19 is derived.

$$\varepsilon 0 = \sqrt{(R1^2 + p1^2)} - R1 \quad \text{(Formula 19)}$$

Due to the presence of the suction position error ε0, a positional deviation margin of the reagent dispensing mechanism is reduced in the first suction port 31 and the third suction port 33. Even if the rotational track becomes slightly larger than in such a state, it is desirable to equalize the suction position error at each suction port from a viewpoint of ensuring stability of the suction operation. Therefore, in order to equalize the suction position error at each suction port, the rotational track diameter of the reagent dispensing mechanism is extended by ε. In this case, a suction position error of the second suction port 32 is ε, a suction position error of the first suction port 31 or the third suction port 33 becomes (ε0−ε), and a relationship of Formula 20 is established to equalize the errors.

$$\varepsilon = \tfrac{1}{2}\varepsilon 0 \quad \text{(Formula 20)}$$

Accordingly, the rotational track diameter R of the optimal reagent dispensing mechanism 114 is expressed by Formula 21.

$$R = R1 + \varepsilon \quad \text{(Formula 21)}$$

Based on the above relationship, optimization of the outer diameter D of the reagent disk 2 and the diameter of the rotational track of the reagent dispensing mechanism 114 is examined. As a specific example, optimization is examined in a case where the mounting number N of the reagent bottle 3 to the reagent disk 2 is 28, the length d of the reagent bottle 3 in the width direction is 22 mm, the length w in the depth direction is 78 mm, the distance p1 between the suction ports is 26 mm, the distance d1 between the reagent bottles is 5 mm, the clearance d2 between the reagent bottle 3 and the inner periphery of the reagent cooling box is 5 mm, the thickness d3 of the reagent cooling box is 40 mm, the diameter d4 of the drive mechanism of the reagent dispensing mechanism 114 is 100 mm. FIGS. 7 to 10 respectively show a relationship (FIG. 7) between the inclination θ of the reagent bottle 3 and the outer diameter D of the reagent cooling box, a relationship (FIG. 8) between the inclination θ of the reagent bottle 3 and the rotational track diameter (the minimum value) R1 of the reagent dispensing mechanism 114, a relationship (FIG. 9) between the inclination θ of the reagent bottle 3 and the suction position error ε, and a relationship (FIG. 10) between inclination θ of the reagent bottle 3 and rotational track diameter R of reagent dispensing mechanism, which are calculated with changing the inclination θ of the reagent bottle 3 from 0° to 45°.

From FIG. 7, it can be seen that no correlation is observed between the inclination θ of the reagent bottle and the outer diameter D of the reagent cooling box when θ<30°, and the outer diameter D of the reagent cooling box rapidly increases beyond 500 mm when θ exceeds 30°.

From FIG. 8, it can be seen that there is a correlation between the inclination θ of the reagent bottle and the diameter (the minimum value) R1 of the rotational track of the reagent dispensing mechanism, and that as the inclination θ of the reagent bottle 3 becomes larger, the minimum value R1 of the rotational track diameter of the reagent dispensing mechanism 114 becomes smaller, so that it is possible to downsize the reagent dispensing mechanism 114. When a maximum value of the diameter of the rotational track on which the reagent dispensing mechanism can perform the dispensing operation stably is 200 mm, it is desirable to set the inclination θ to 20° or more. A case where θ is 0° corresponds to a case where the reagent bottle is radially provided in the reagent disk as in the related art. As can be seen from FIG. 8, when the reagent bottle is radially provided in the reagent disk, the diameter of the rotational track is too large to allow the reagent dispensing mechanism to perform the rotating operation to access a plurality of suction ports of one reagent bottle. Therefore, in the related art, as illustrated in FIG. 11, the diameter of the rotational track is reduced by differentiating the reagent bottle accessed by the reagent dispensing mechanism in accordance with the suction port.

On the other hand, from FIG. 9, it can be seen that there is a correlation between the inclination θ of the reagent bottle 3 and the suction position error ε, and that the suction position error ε increases as the inclination θ of the reagent bottle 3 increases. If the inclination θ exceeds 40°, the suction position error becomes 1.0 mm or more, and mounting of the reagent bottle 3 becomes difficult due to a relationship between the suction position error and the size of the suction port of the reagent bottle 3. FIG. 10 illustrates the inclination θ of the reagent bottle and the rotational track diameter R of the reagent dispensing mechanism. Although the relationship among R, R1, and ε is as shown in Formula 21, the obtained knowledge is the same as that in FIG. 8 because R1»ε.

From the above, it can be seen that when the inclination θ of the reagent bottle is 20°≤θ≤30°, it is possible to mount the reagent bottle on the automatic analyzer by reducing the outer diameter D of the cooling box and the rotational track diameter R of the reagent dispensing mechanism. Therefore, when the reagent bottle 3 is obliquely arranged on the reagent disk 2, it is desirable to arrange the reagent bottle by inclining the reagent bottle by θ (20°≤θ≤30°) with respect to the diameter of the reagent disk 2.

While the invention made by the inventors has been specifically described based on the embodiments, the invention is not limited to the embodiments described above, and various changes and modifications may be made without departing from the scope of the invention.

REFERENCE SIGN LIST 1 automatic analyzer
2 reagent disk
3 reagent bottle
4 region
5 access position of magnetic particle stirring device
31 first suction port
32 second suction port
33 third suction port
51 line
101 rack
102 sample container
103 sample dispensing mechanism
104 incubator disk
105 reaction vessel
106 conveyance mechanism
107 holding member
108 stirring mechanism
109 disposal hole
110 sample dispensing chip mounting position
114 reagent dispensing mechanism
115 magnetic particle stirring device
116 reaction vessel conveying mechanism
117 detection unit
118 rack conveying line
120 rack conveying unit
121 power-on instructing unit
122 power-off instructing unit
123 control computer
201 reagent bottle
202, 203, 204 suction port
210 reagent disk
211 reagent dispensing mechanism
301 suction port
302 lid
303 shoulder portion
304 projection portion
305 hinge
306 sealing member

The invention claimed is:

1. An automatic analyzer comprising:
a reagent disk that accommodates a plurality of reagent bottles including a plurality of suction ports and conveys the reagent bottles to a desired position by rotating in a circumferential direction around a central axis; and
a reagent dispensing mechanism that rotates around a rotational axis and sucks a reagent of the reagent bottle placed at a predetermined position on the reagent disk, wherein
the reagent bottle is accommodated in the reagent disk such that the central axis of the reagent bottle and a diameter of the reagent disk form a predetermined inclination θ (θ>0), wherein
a rotational track of the reagent dispensing mechanism passes over a plurality of suction ports of one reagent bottle placed at the predetermined position on the reagent disk.

2. The automatic analyzer according to claim 1, further comprising:
a cover that covers the reagent disk, wherein
the reagent dispensing mechanism accesses one of the plurality of suction ports of the one reagent bottle from an opening provided in the cover.

3. The automatic analyzer according to claim 2, further comprising:
a reagent container lid opening and closing mechanism that is provided at a position of the opening to open and close a lid provided at the suction port of the reagent bottle.

4. The automatic analyzer according to claim 2, further comprising:
a magnetic particle stirring device that rotates around a rotational axis and stirs a magnetic particle solution of the reagent bottle, wherein
the magnetic particle stirring device accesses a predetermined suction port of the one reagent bottle from the opening provided in the cover.

5. The automatic analyzer according to claim 4, wherein
the one reagent bottle includes a first container for containing the magnetic particle solution and a second container for containing the reagent, and
while the magnetic particle stirring device accesses the first container of the one reagent bottle and stirs the magnetic particle solution, the reagent dispensing mechanism accesses the second container of the one reagent bottle and dispenses the reagent.

6. The automatic analyzer according to claim 1, wherein
the reagent bottle includes a first suction port, a second suction port, and a third suction port disposed at an equal distance in order from the inside in a state of being disposed on the reagent disk, and the inclination θ is an angle between the central axis of the reagent bottle passing through a center of the second suction port and the diameter of the reagent disk passing through the center of the second suction port, and satisfies 20≤θ≤30.

* * * * *